Oct. 20, 1942.    G. E. KING ET AL    2,299,152
VARIABLE VOLTAGE CONTROL SCHEME
Filed Oct. 30, 1941

WITNESSES:

INVENTORS
George E. King and
William H. Formhals.
BY
Paul E. Friedemann
ATTORNEY Patented Oct. 20, 1942

2,299,152

UNITED STATES PATENT OFFICE 2,299,152

VARIABLE VOLTAGE CONTROL SCHEME

George E. King, Wilkinsburg, and William H. Formhals, Forest Hills, Pa., assignors to Westinghouse Electric & Manufacturing Company, East Pittsburgh, Pa., a corporation of Pennsylvania Application October 30, 1941, Serial No. 417,162

5 Claims. (Cl. 172—240)

Our invention relates to variable voltage control schemes for motors and more particularly reversing control schemes for reversing direct current motors operating reciprocating devices such as planar platens, draw cut shapers, or other apparatus requiring reciprocation.

In the art of operating relatively small planers as thirty inch planers and other similar machines, the reciprocation is, with the prior art devices, accomplished by means of belt shifting devices. With the present trend toward increased, uninterrupted production, the shortcomings of the prior art devices have become so apparent that improved uninterrupted operations become a necessity.

One object of our invention is the provision of a simple, inexpensive, reliable, efficient, and fast electrical reversing control for a direct drive of a reversing direct current motor.

Other and more detailed objects of our invention will become more apparent from a study of the following specification and the accompanying drawing, in which.

Figure 1:
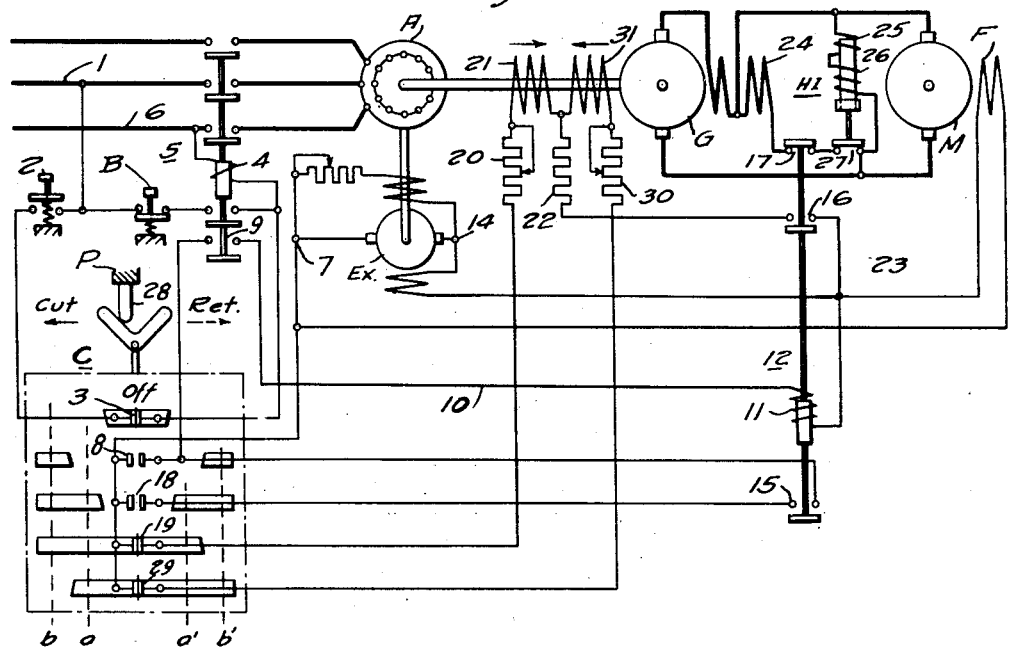
Figure 1 is a diagrammatic showing of an embodiment of our system of control.

Our equipment includes a motor generator set comprising motor A and generator G with an exciter Ex, a control B for starting the motor generator set, a motor M for driving a reciprocating device as a planer platen P, and a scheme of control for the motor M.

In order to simplify the control scheme and to obtain the other novel results we obtain with our system of control, we provide the generator G with two separate field windings 21 and 31, one for use when operating the planer platen in the cut direction and the other field winding for use when operating the planer platen in the return direction.

Our scheme of control provides for the operation of these two generator fields 21 and 31 in a definite sequence. The two fields are always connected in parallel before disconnecting the one last used. The control is such that the two fields are so connected to the exciter Ex that their magnetomotive forces neutralize each other when of equal strength. When both are connected to the exciter at the same time, we have in effect essentially a non-inductive circuit. Thus when one of the field windings is opened by a suitable electromagnetic switch, no damage can be done to the switch contacts. There is no arcing with the consequent danger of welding the contacts. If the fields were not connected in parallel during the transition from one direction of operation to another direction of operation, the switch would be called upon to open a highly inductive circuit.

With our arrangement and control we do not only protect the switches, but also get a smooth reversal from one direction of rotation of the motor to the other direction of rotation with correspondingly smaller armature current peaks. Further, since the field rheostats can be adjusted over a wide range we get, in our combination, a much wider speed range of cut and return speeds than can be gotten with belt shifting devices thus resulting in increased production. Also the maintenance cost is much less with our control than with belt shifting devices.

A still better understanding of our invention and some further objects and novel results will become apparent from a study of typical operations.

If the attendant wishes to start the operation, he operates the start button 2 to start the motor generator set. The circuit for this operation may be traced from bus 1 through start button 2, reset contact members 3 of controller C, coil 4 of the main contactor 5 to the bus 6.

It should be noted that the reset contact members are in series with starting switch 2 thus making it necessary to move the controller to the off position. This is a valuable safety feature. Our control scheme, of course, includes overload protection, over temperature protection, etc., features not shown because they do not constitute part of our invention.

When the motor A is at full speed, the voltage of exciter Ex is at full value. The exciter is compound-wound as shown and the field F of the motor M is connected to the exciter through the series field of the exciter so that the motor M is fully excited and thus ready for operation of the planer platen P.

After the motor generator set is in operation, the planer platen can be caused to move, say, in the cut direction by moving the controller C in the cut direction, the movement being from the "off" position through the *a* position to the *b* position.

In the *b* position the following circuits are established. One circuit may be traced from the left-hand terminal 7 of the exciter Ex through controller contact member 8 of controller C, contact members 9 of the main contactor 5, conductor 10, actuating coil 11 of control relay 12 to the conductor 23 connected to the other terminal 14 of the exciter.

By the operation of the relay 12, contact members 15 and 16 are closed and contact members 17 are opened. Closure of contact members 15 provides for a hold-in circuit for coil 11 through contact fingers 18 of controller C and through contact members 15 both completing the circuit in parallel to contact fingers 8.

Closure of contact members 16 connects generator field 21 to the exciter. The circuit for this field 21 may be traced from terminal 7 through contact fingers 19, rheostat 20, field 21, resistor 22, and contact members 16 to the energized conductor 23. The opening of contact members 17 opens the circuit for the generator differential field 24.

The generator voltage thus builds up, the planer motor M accelerates and runs in the cut direction at the speed set by the cut rheostat 20.

Since the generator voltage is up the two coils 25 and 26 of the time limit control relay HI are energized and the contact members 27, in series with contact members 17, open.

To stop the planer, the controller C is moved to the off position. It will be noted that during the transition from the cut to the off position, the contact fingers 19 close paralleling the generator cut and return fields and then the contact fingers 18 open deenergizing coil 11 of relay 12. The relay contact members 16 open disconnecting both generator fields 21 and 31 simultaneously from the line. The normally closed back contact members 17 on relay 12 close. The generator voltage collapses and the planer motor slows down. The coils 25 and 26 are deenergized. The relay contact members 17 close connecting the generator differential field 24 across the generator armature, killing the residual voltage, bringing the planer motor to rest and preventing it from creeping.

Figure 3:
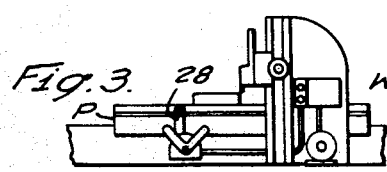
Fig. 3 shows a planer provided with our reversing control.

It will be noted that at the first starting only the particular generator field needed is energized, whereas when the controller C is moved, either automatically by dog 28 on the planer platen P, see Fig. 3, or manually, back and forth to alternately cause the platen to move in the cut direction and then in the return direction the energization of the generator is different. For instance, if the platen has moved to the end of its stroke in the cut direction and the controller is then, either automatically or manually moved from the b position through the positions a, "off," a' to the b' position the sequence is a very definite one and is as follows: In the a position a circuit is established from exciter terminal 7 through contact fingers 29, return rheostat 30, field 31, resistor 22, and contact members 16 to energized conductor 23. The field windings 21 and 31 are thus connected in parallel and in opposition. The two fields substantially neutralize each other, depending somewhat on the setting of rheostats 20 and 30. In the "off" position, coil 11 of relay 12 is deenergized by the opening of its circuit at contact fingers 18. As soon as the voltage of generator G decreases, which will be quite rapidly in view of the explained connection of fields 21 and 31, the coils 25 and 26 of the time limit relay HI are deenergized but in view of the time constant of this relay contact members 27 do not close.

The deenergization of coil 11 causes the opening of the energizing circuit for the parallel connected fields 21 and 31 at contact members 16. Since the circuit is a substantially non-inductive circuit no arcing occurs at contact members 16.

A moment later the controller is in the a' position. The fields 21 and 31 remain connected in parallel and opposition in position a'. As the controller is moved to the b' position the circuit for field 21 is opened at contact fingers 19. Since the field 21 at this stage is part of a substantially non-inductive circuit no arcing or other harmful effects are produced on contact fingers 19.

In the b' position coil 11 is again energized and contact members 16 close. In this b' position the energizing circuit for field 31 above traced is again established and the motor thus operates to move the planer platen in the return direction. Since the controller segments are arranged symmetrically with reference to the controller contact fingers, the sequence is the same when the reversal is to be accomplished at the end of the return stroke.

For automatic operation the dog 28 on the planer platen automatically actuates the controller 6 at each end of the stroke.

On failure of power on the alternating current buses the main contactor 5 opens thus stopping the whole system. If manual stopping is desired of the motor M only the controller C is moved to the "off" position.

Figure 2:
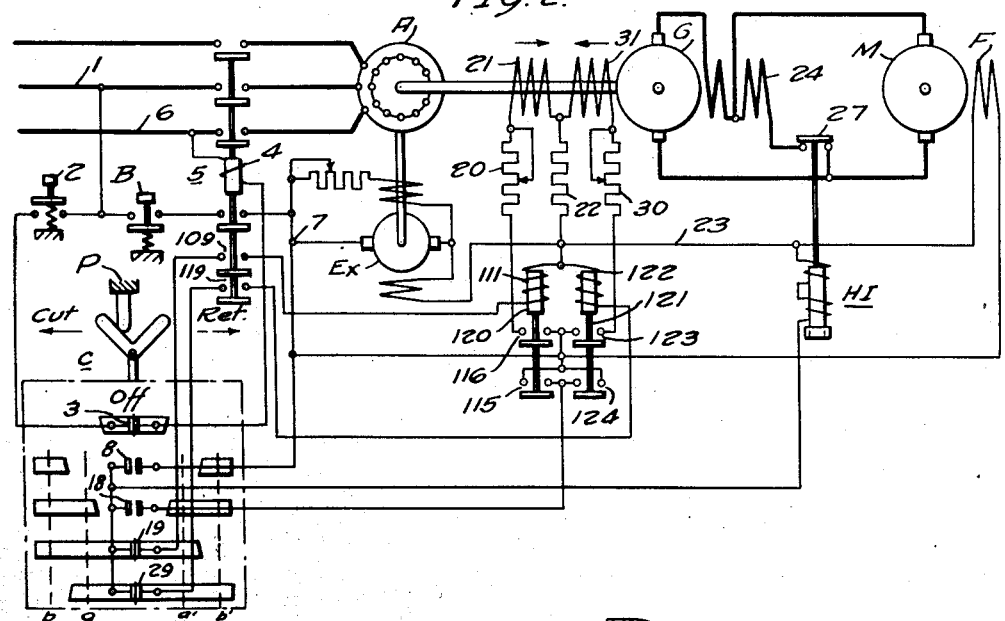
Fig. 2 is a diagrammatic showing of a modification of our system of control.

In the modification shown in Fig. 2, all the elements that are the same as the elements shown in Fig. 1 have been given the same reference characters. It will be noted that two control relays 120 and 121 are used to obtain the function accomplished by control relay 12 and that the HI relay is made responsive to the exciter voltage but controlled by the contacts on relays 120 and 121.

In the b position contacts members 8 and 19 of controller C are closed and a circuit is established from terminal 7 through control members 19, through contact members 109, coil 111, to energized conductor 23. When contact members 116 are closed the field 21 is connected to the exciter and the closure of contact members 115 with the closed contact fingers 19 establishes a shunt circuit for contact members 8. As the controller is moved from the b position to the a position, the circuit for coil 111 remains closed. A further circuit is, however, established from terminal 7 through contact members 115, contact fingers 18 and 29, contact members 119 of contactor 5, coil 122 to the energized conductor 23. Contact members 123 and 124 are thus closed. The fields are connected in parallel. As the controller is moved through positions "off," a' to position b', the sequence is the same as for Fig. 1.

The circuit arrangements we have shown are not to be taken in a limiting sense but the only limitation of our invention is to be determined by the appended claims.

We claim as our invention:

1. In a reversing control for a direct current motor operating a reversing mechanism, in combination, a direct current motor having a field winding and an armature winding, means for exciting the field winding, a generator having an armature winding connected to the motor armature winding to cause operation of the motor, means for operating the generator, said generator having a field winding for causing the motor to operate in one direction and a second field winding for causing the motor to operate in the other direction, control means operable to alternately energize said generator field windings and means for simultaneously energizing said generator field windings during the transition of said alternate energization of said generator field windings.

2. In a reversing control for a direct current motor operating a reversing mechanism, in combination, a direct current motor having a field winding and an armature winding, means for exciting the field winding, a generator having an armature winding connected to the motor armature winding to cause operation of the motor, means for operating the generator, said generator having a field winding for causing the motor to operate in one direction and a second field winding wound in an opposite sense on the same field structure to cause the motor to run in the other direction, and reversing control means for the motor for successively energizing one generator field winding, both generator field windings, and the other generator field winding.

3. In a reversing control for a direct current motor operating a reversing mechanism, in combination, a direct current motor having a field winding and an armature winding, means for exciting the field winding, a generator having an armature winding connected to the motor armature winding to cause operation of the motor, means for operating the generator, said generator having two oppositely wound field windings on the same field structure, a source of direct current for energizing said generator field windings, means for successively connecting said first one generator field winding, then both generator field windings, and then the other generator field windings to said source of direct current.

4. In a reversing control for a direct current motor operating a reversing mechanism, in combination, a direct current motor having a field winding and an armature winding, means for exciting the field winding, a generator having an armature winding connected to the motor armature winding to cause operation of the motor, means for operating the generator, said generator having a field winding for causing the motor to operate in one direction and a second field winding wound in an opposite sense on the same field structure to cause the motor to run in the other direction, a source of direct current energy, means for connecting said generator field windings to said source of direct current, said means including contactor means operable, while one of the generator field windings is connected to said source of direct current for one direction of operation of the motor, to connect the other of said field windings to said source so that both field windings are connected to said source of direct current, whereby said connection becomes a substantially non-inductive circuit, and to then disconnect the generator field winding, originally connected to said source from said source of direct current.

5. In a reversing control for a direct current motor operating a reversing mechanism, in combination, a direct current motor having a field winding and an armature winding, means for exciting the field winding, a generator having an armature winding connected to the motor armature winding to cause operation of the motor, means for operating the generator, said generator having a field winding for causing the motor to operate in one direction and a second field winding wound in an opposite sense on the same field structure to cause the motor to run in the other direction, a source of direct current energy, means for connecting said generator field windings to said source of direct current, said means including contactor means operable, while one of the generator field windings is connected to said source of direct current for one direction of operation of the motor, to connect the other of said field windings to said source so that both field windings are connected to said source of direct current, whereby said connection becomes a substantially non-inductive circuit, and to then disconnect the generator field winding, originally connected to said source from said source of direct current.

GEORGE E. KING.
WILLIAM H. FORMHALS.